United States Patent
Mah et al.

[11] Patent Number: 5,996,184
[45] Date of Patent: Dec. 7, 1999

[54] CLIP FOR PORTABLE ELECTRONIC DEVICES

[75] Inventors: Ah Kow Mah, Penang; Chong Meng Lee, Kedah, both of Malaysia

[73] Assignee: Motorola, Inc., Schaumburg, Ill.

[21] Appl. No.: 09/247,963

[22] Filed: Feb. 10, 1999

[51] Int. Cl.[6] .............................. A44B 21/00; A45F 5/00
[52] U.S. Cl. ................ 24/3.12; 24/3.11; 24/597
[58] Field of Search ................... 24/3.12, 3.11, 24/3.1, 597

[56] References Cited

U.S. PATENT DOCUMENTS

| | | | |
|---|---|---|---|
| 4,881,150 | 11/1989 | Oyamada | 24/3.11 |
| 5,274,885 | 1/1994 | Hellweg | 24/3.12 |
| 5,385,282 | 1/1995 | Chen | 24/3.11 |
| 5,664,292 | 9/1997 | Chen | 24/3.12 |
| 5,730,342 | 3/1998 | Tien | 24/3.12 |
| 5,906,031 | 5/1999 | Jensen | 24/3.12 |

FOREIGN PATENT DOCUMENTS 4187102  7/1992  Japan ......................................... 24/3.1

*Primary Examiner*—Victor N. Sakran
*Attorney, Agent, or Firm*—Dale W. Dorinski

[57] ABSTRACT

A clip (10) for attaching a portable electronic device (50) to an article of clothing. Clip (10) has a latch member (12) and a mount guide (14). Retainers (22,24) of latch member (12) engages an engagement member (62) on a housing (52) for device (50). Coaction between mount guide (14) and a housing guide (54) guides movement between clip (10) and housing (52) for complementary engagement of latch member (12) to engagement member (62). Latch member (12) resiliently couples to mount guide (14) to allow for movement away from engagement member (62) using lever actuator (20). Thereafter, housing (52) can then be moved to a releasable position from which device (50) can be dismounted. Clip (10) also has a lock (70) to prevent movement of latch member (12) away from engagement member (62) for a locked position when device (50) is mounted to clip (10).

8 Claims, 3 Drawing Sheets

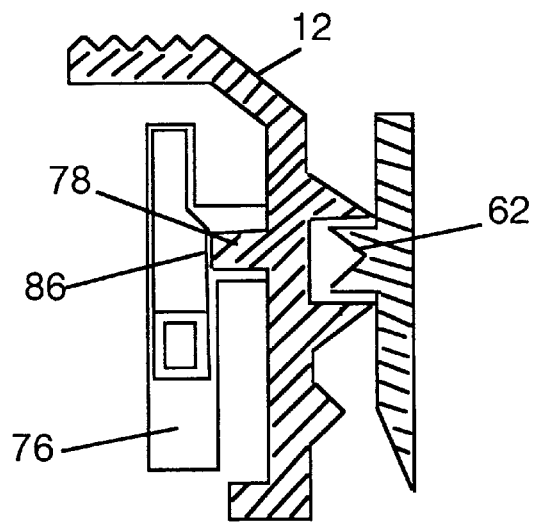
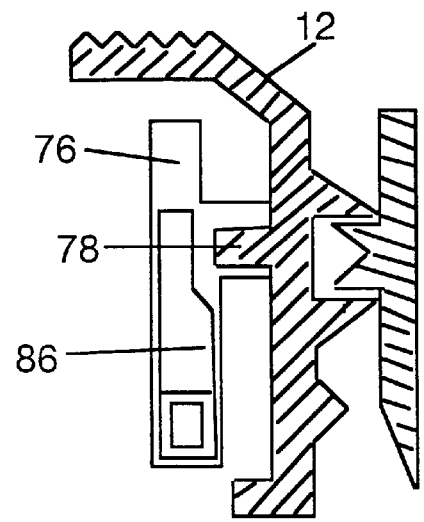
FIG. 7          FIG. 8
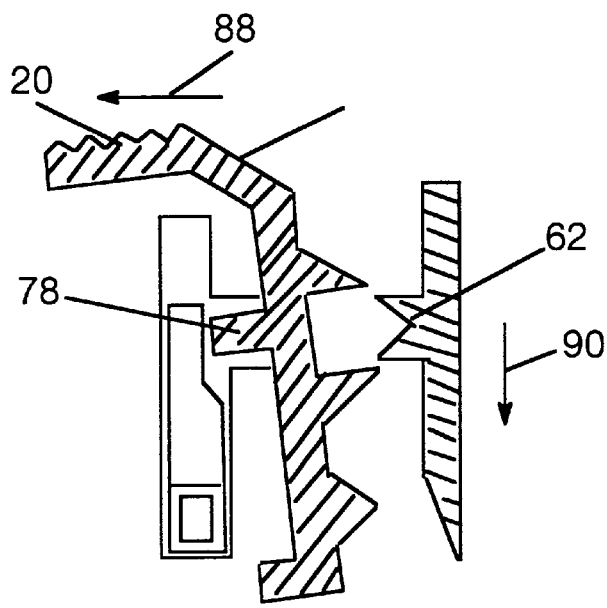
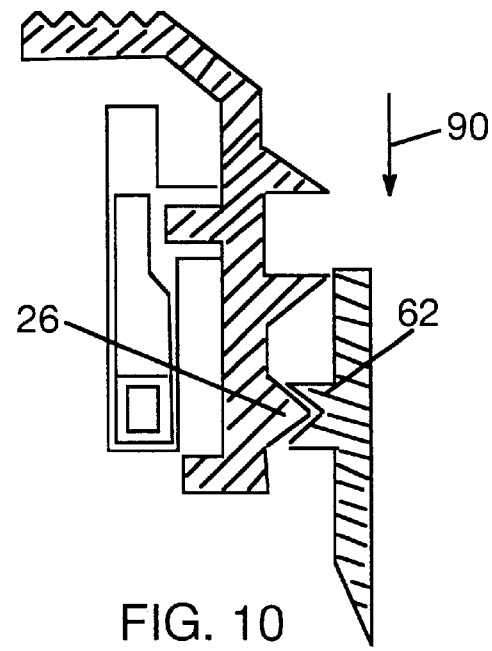
FIG. 9          FIG. 10

CLIP FOR PORTABLE ELECTRONIC DEVICES

FIELD OF THE INVENTION

This invention relates to clips for portable electronic devices to attach such devices to a user's article of clothing. In particular, this invention relates to, but is not necessarily limited to, a clip to enable a user to dismount a portable electronic device in the same direction as mounting.

BACKGROUND OF THE INVENTION

Portable electronic devices can be attached to users' articles of clothing using clips. Attached in this manner, the devices can be positioned in close proximity to the users for immediate use when needed. Another reason for using a clip as such is to allow both hands of a user to be free to perform other functions. For example, a communication radio attached by a clip to a waist belt allows the user of the communication radio to use his hands for other purposes.

A clip typically includes a retaining feature to prevent accidental detachment of, for example, the communication radio from the waist belt. The retaining feature is commonly formed by shaping part of the clip to hook or grip the waist belt.

However, having a clip that attaches securely to a waist belt can be a problem when immediate use of a portable electronic device is needed. For example, a user may find it difficult to detach a communication radio to respond in time to a communication call. As a result, a repeat transmission of the communication call may be made by a caller thinking that the communication call was not received. Furthermore, frequent attachment and detachment of the portable electronic device having a conventional clip as described above can cause damage to the article of clothing.

To overcome these problems, some clips include what is commonly referred to as a holster to hold a portable electronic device. Typically, the holster has an opening on a top surface for inserting or removing the portable electronic device mounted within. However, dismounting the portable electronic device requires a lifting motion at an awkward angle that is uncomfortable most users. This again can slow down such users in responding to a need to use the portable electronic device quickly.

SUMMARY OF THE INVENTION

It is an object of this invention to overcome or at least alleviate at least one of the problems associated with clips for portable electronic devices.

According to one aspect of the invention, there is provided a clip for a portable electronic device, said clip comprising:

at least one latch member for complementary engagement with at least one other latch member, said other latch member being disposed on a housing for said portable electronic device; and a mount guide associated with said latch member, said mount guide being to coact with at least one portion of said housing to enable relative movement of said housing with respect to said clip, wherein, in use, said mount guide allows mounting of said portable electronic device for said complementary engagement and dismounting from said clip to be effected in a single direction.

BRIEF DESCRIPTION OF THE DRAWINGS

In order to describe the invention and to put it into practical effect, reference will now be made to a preferred embodiment as illustrated with reference to the accompanying drawings in which:

FIGS. 7 to 10 show various stages of engagement between the engagement member of FIG. 6 and retainers of the clip of FIG. 1.

DETAILED DESCRIPTION OF THE INVENTION

Figure 1:
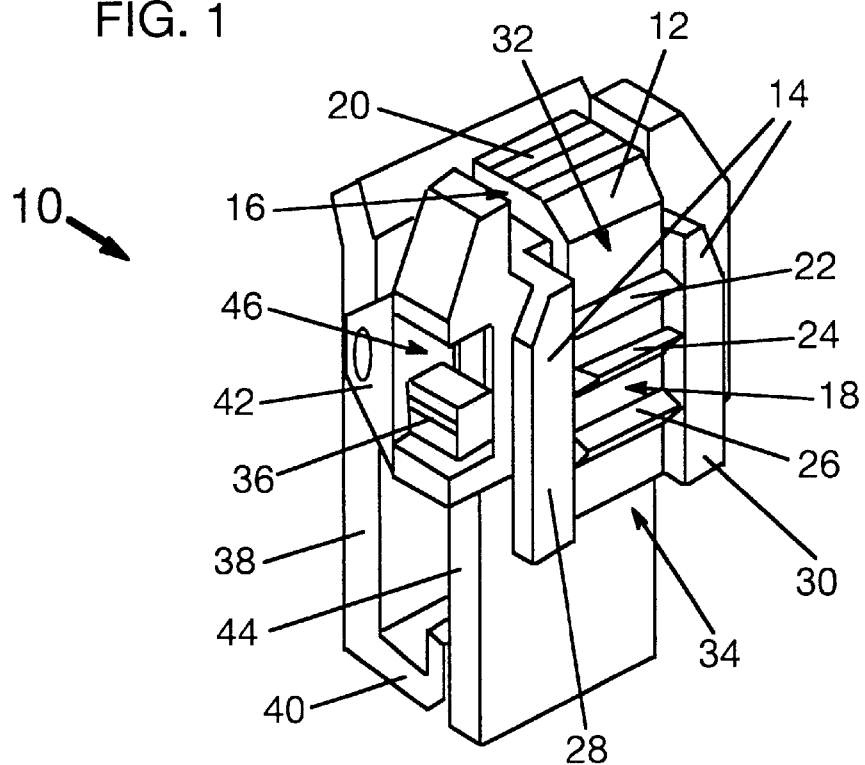
FIG. 1 is an isometric view of a clip in accordance with a preferred embodiment of the invention.

In accordance with a preferred embodiment of the invention, FIG. 1 is an isometric view of a clip 10. Clip 10 comprises a latch member 12 and a mount guide 14.

Latch member 12 has an upper portion 16 and a lower portion 18. Upper portion 16 is at a right angle relative to lower portion 18. Disposed on upper portion 16 is a lever actuator 20. Lever actuator 20 is corrugated to allow ease of actuation by a user of clip 10. On lower portion 18 are an upper retainer 22, lower retainer 24 and holder 26.

Mount guide 14 is associated with latch member 12 and has a left mount track 28 and a right mount track 30. At one end of mount guide 14 is an entrance 32 for mounting a portable electronic device (not shown). At an opposite end of mount guide 14 is an exit 34 for dismounting such a portable electronic device. A substantial part of lower portion 18 is disposed between left and right mount tracks 28,30.

Clip 10 further comprises a lock actuator 36. Lock actuator 36 couples to a lock for locking latch member 12. Details of this lock will be described below. Clip 10 also comprises a clip retainer 38 having a hooked end 40. A hinge 42 couples clip retainer 38 to a mount support 44 for supporting latch member 12 and mount guide 14. Mount support 44 has a slot 46 for movement of lock actuator 36.

Figure 2:
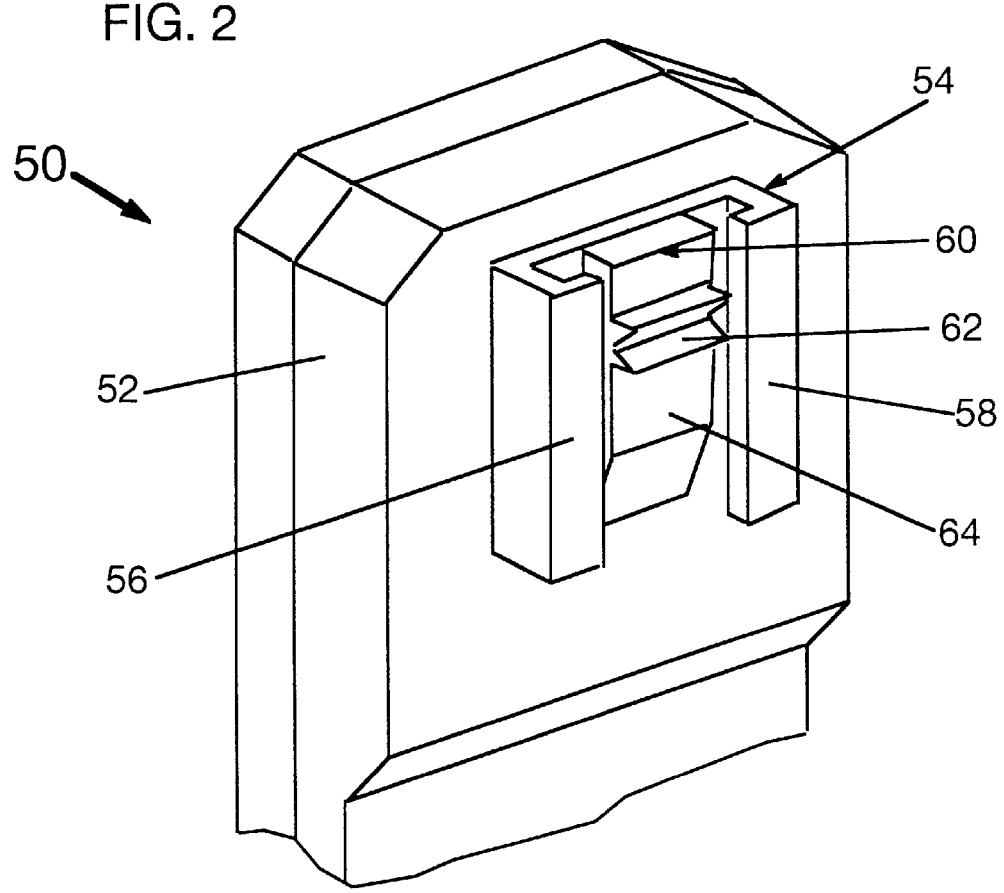
FIG. 2 is an isometric view of part of a portable electronic device for clipping to the clip of FIG. 1.

FIG. 2 is an isometric view of part of a portable electronic device 50 for mounting to clip 10. Portable electronic device 50 can be, for example, a communication radio or a radio transceiver, and includes a housing 52. Mount guide 14 coacts with at least one portion of housing 52 to enable relative movement of housing 52 with respect to clip 10. In the preferred embodiment of this invention, this portion comprises a housing guide 54.

Housing guide 54 includes a left housing track 56 and a right housing track 58. Disposed between left and right housing tracks 56,58 is one other latch member 60. Latch member 60 comprises an engagement member 62 extending laterally from a support base 64.

Complementary engagement between latch members 12,60 occurs when mounting portable electronic device 50 onto clip 10. In use, mount guide 14 allows mounting of portable electronic device 50 for this complementary engagement and dismounting from clip 10 to be effected in a single direction. When mounting or dismounting portable electronic device 50, relative movement of housing 52 in the single direction with respect to clip 10 is provided when mount guide 14 coacts with housing guide 54.

Advantageously, the invention enables a user to detach portable electronic device 50 from clip 10 simply by disengaging latch member 12 from engagement member 62. Upon disengaging from engagement member 62, portable electronic device 50 can then slide down mount guide 14 along left and right mount tracks 28,30 for subsequent removal from clip 10. Unlike conventional clips, dismounting of portable electronic device 50 is therefore in the same direction as mounting and does not require clip 10 to be detach from an article of clothing.

Figure 3:
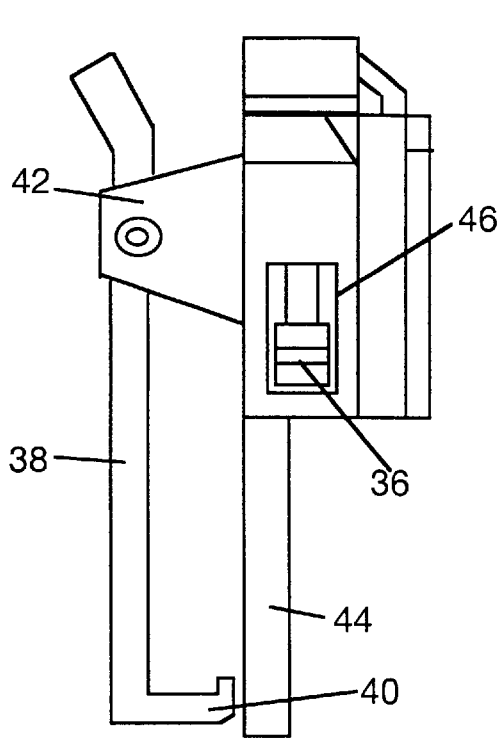
FIG. 3 is a side view of the clip of FIG. 1.
Figure 4:
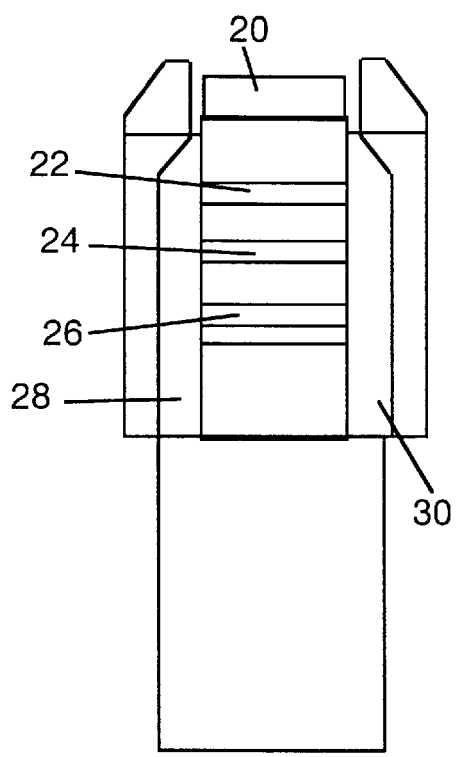
FIG. 4 is a front view of the clip of FIG. 1.

FIGS. 3 and 4 show a side view and a front view, respectively, of clip 10. Disposition of clip retainer 38, hooked end 40, hinge 42 and mount support 44 relative to each other is shown in FIG. 3. Also shown in FIG. 3 is lock actuator 36 within slot 46. FIG. 4 shows relative disposition of lever actuator 20, upper retainer 22, lower retainer 24 and holder 26 with respect to left and right mount tracks 28,30.

Figure 5:
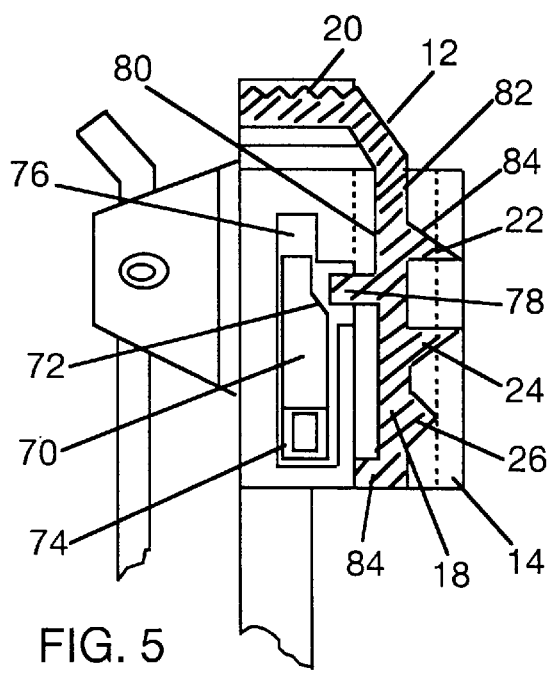
FIG. 5 is a cross-sectional side view of part of the clip of FIG. 1.

FIG. 5 is a cross-sectional side view of part of clip 10. In this view, details of a lock 70 is indicated. Lock 70 is an elongated bar having an angled section 72. Lock actuator 36 couples to lock 70 at a lower end 74 and allows for actuation of lock 70 to thereby move the elongated bar along internal slot 76. FIG. 5 also shows a stub 78 extending laterally from a rear surface 80 of latch member 12 (shaded). Rear surface 80 is opposite to a front surface 82 from which retainers 22,24 and holder 26 extend. As can be seen in this view, lever actuator 20 is corrugated and latch member 12 has a coupling 84 to mount guide 14 at lower portion 18. Upper retainer 22 has a sloping surface 84.

Figure 6:
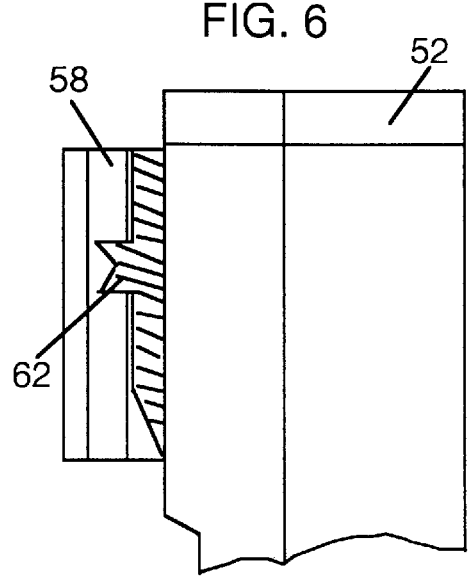
FIG. 6 is a cross- sectional side view of part of the portable electronic device of FIG. 2 showing an engagement member.

FIG. 6 shows a cross-sectional side view of part of portable electronic device 50. In this view, engagement member 62 is shown to have a trough to fit into a recess formed by upper and lower retainers 22,24.

Specifically, mounting starts by aligning housing guide 54 to mount guide 14 at entrance 32. Upon alignment, portable electronic device 50 is then pushed down to achieve the complementary engagement between upper and lower retainers 22,24 and engagement member 62. Latch member 12 is resiliently coupled to mount guide 14 so as to allow movement to achieve this complementary engagement. Hence, as portable electronic device 50 is being pushed down, engagement member 62 pushes against sloping surface 84 to force latch member 12 to move inwards towards mount support 44. After engagement member passes the lower edge of sloping surface 84, engagement member 62 snaps into the recess between upper and lower retainers 22,24.

Disengagement from latch member 12 begins with a user pushing lever actuator 20 away from engagement member 62. Such pushing separates latch member 12 from engagement member 62 so that lower retainer 24 does not retain engagement member 62 within the recess. As a result, portable electronic device 50 can slide further down along mount guide 14 to allow engagement member 62 to engage holder 26. Specifically, the trough of engagement member 62 sits into a pointed edge of holder 26. At this position, portable electronic device 50 is in a releasable position before dismounting from clip 10. Thereafter, resiliency of latch member 12 permits portable electronic device 50 to be dismounted with a further push to disengage from clip 10.

FIGS. 7 to 10 show various stages of engagement between engagement member 62 and retainers 22,24 and holder 26. Also shown in FIGS. 7 to 10 is disposition of the elongated bar of lock 70 with respect to internal slot 76.

Specifically, FIG. 7 shows a locked position in which a section 86 of the elongated bar prevents movement of stub 78 into internal slot 76. As a result, latch member 12 cannot be moved away to disengage from engagement member 62. FIG. 8 shows an unlocked position in which section 86 is moved away from abutting stub 78. This then allows some leeway for stub 78 to move into internal slot 76 when lever actuator 20 is actuated to move latch member 12. Movement between the locked and unlocked positions of lock 70 is actuated with a user selectably moving lock actuator 36.

FIG. 9 shows latch member 12 being moved away from engagement member 62 in a direction indicated with arrow 88 when actuating lever actuator 20. As a result of this actuating, movement of portable electronic device 50 in a direction shown by arrow 90 is possible.

FIG. 10 shows portable electronic device 50 in the releasable position prior to dismounting from clip 10. In this view, engagement member 62 fits into holder 26. Pushing down on portable electronic device 50 in the direction of arrow 90 can disengage it from clip 10.

This invention advantageously enables portable electronic device 50 to be mounted and dismounted in a manner which overcomes problems of prior art conventional clips. The lifting motion to dismount devices when using such conventional clips is avoided. Furthermore, damage to articles of clothing from frequent attachment and detachment as in conventional clips is alleviated as mounting and dismounting in the invention requires interaction between clip 10 and housing 52 of portable electronic device 50. Furthermore, clip 10 allows users to respond faster when use of portable electronic device 50 is required.

We claim:

1. A clip for a portable electronic device, said clip comprising:

at least one latch member for complementary engagement with at least one other latch member, said latch member having a lower retainer and an upper retainer to retain said other latch member, and a holder for holding said other latch member to thereby provide a releasable position for said portable electronic device before dismounting from said clip said other latch member being disposed on a housing for said portable electronic device; and a mount guide associated with said latch member of said clip, said mount guide having an entrance at one end and an exit at an opposite end thereof, said mount guide being to coact with at least one portion of said housing to enable relative movement of said housing with respect to said clip, wherein, in use, said mount guide allows mounting of said portable electronic device into said entrance for said complementary engagement and dismounting from said clip at said exit to be effected in a single direction.

2. The clip as claimed in claim 1 wherein said clip further comprises a lock for locking said latch member to said other latch member.

3. The clip as claimed in claim 2 wherein said lock comprises a lock actuator for selectably moving said lock between a locked position and an unlocked position.

4. The clip as claimed in claim 1 wherein said latch member is resiliently coupled to said mount guide, said latch member having a lever actuator to enable disengagement from said complementary engagement.

5. The clip as claimed in claim 1 wherein said portion of housing member comprises a housing guide.

6. The clip as claimed in claim 1 wherein said housing is a battery housing.

7. A clip for attaching to a portable electronic device, comprising:

a first latch member having a holder for holding and complementary engagement with a second latch member disposed on said portable electronic device;

a mount guide associated with said first latch member, said mount guide coacting with at least a portion of said portable electronic device to enable relative movement of said portable electronic device with respect to said clip; and wherein, in use, said mount guide allows mounting of said portable electronic device for said complementary engagement and dismounting from said clip to be effected in a single direction, and wherein said first and second latch members co-operate to provide a releasable position for said portable electronic device before dismounting from said clip.

8. A clip for attaching to a portable electronic device, comprising:

a first latch member for complementary engagement with a second latch member disposed on said portable electronic device;

said first latch member resiliently coupled to a mount guide and having a lever actuator to enable disengagement from said complementary engagement;

said mount guide coacting with at least a portion of said portable electronic device to enable relative movement of said portable electronic device with respect to said clip; and wherein, in use, said mount guide allows mounting of said portable electronic device for said complementary engagement and dismounting from said clip to be effected in a single direction.

* * * * *